March 5, 1935.   D. J. STEWART   1,992,971
ALTERNATING CURRENT MOTOR
Filed Dec. 21, 1931
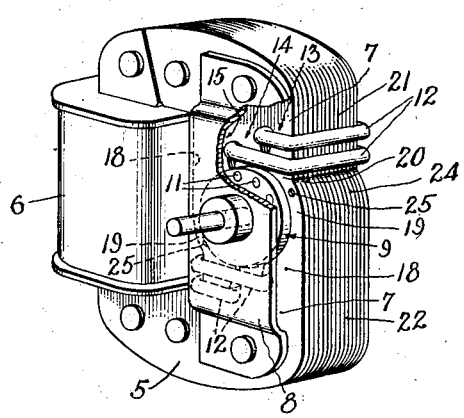
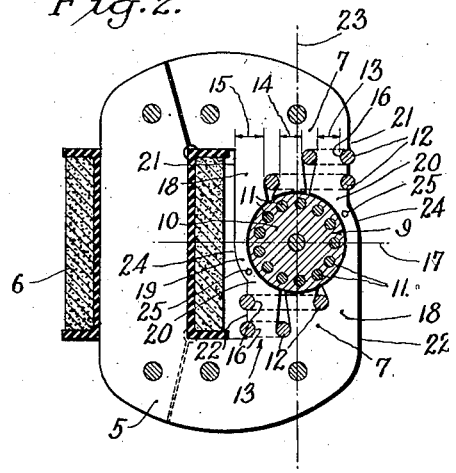
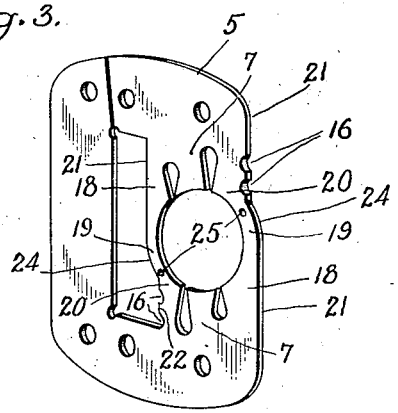
INVENTOR
Duncan J. Stewart
BY
ATTORNEYS Patented Mar. 5, 1935

1,992,971

UNITED STATES PATENT OFFICE 1,992,971

ALTERNATING CURRENT MOTOR

Duncan J. Stewart, Rockford, Ill., assignor to Howard D. Colman, Rockford, Ill.

Application December 21, 1931, Serial No. 582,193

12 Claims. (Cl. 172—278)

My invention relates generally to alternating current induction motors in which shifting of the magnetic field around the rotor recess is produced by the action of shading coils enclosing side portions of the poles.

As set forth in Patent No. 1,822,679 issued to myself and Edgar D. Lilja, motors of the above class deliver a high output when formed with magnetic extensions of the unshaded side tips of the poles following closely adjacent the rotor surface and enlarging the range of distribution of the unshaded flux so that a substantial amount of the latter will enter the rotor beyond the median plane between the poles. A substantial area of the rotor iron not required for efficient utilization of the inherently weaker shaded field is availed of for increasing the amount of unshaded flux utilized.

The primary object of the present invention is to provide, in a motor of the above character, a new and improved construction of the stator which effects still more efficient distribution and utilization of the unshaded flux resulting in a substantial increase in the output of the motor without increasing the overall dimensions of the motor appreciably.

Other objects and advantages of the invention will become apparent from the following detailed description taken in connection with the accompanying drawing, in which Figure 1 is a perspective view of a motor embodying the features of the present invention.

Fig. 2 is an actual size vertical sectional view of the motor shown in Fig. 1.

Fig. 3 is a perspective view of one of the stator laminations.

Referring now to the drawing, the core type stator of the motor comprises a laminated field member 5 of generally rectangular shape being approximately two inches wide, three inches long and three-fourths of an inch thick. A main winding 6 encloses one side leg of the member 5 and preferably employs approximately 500 ampere turns to work the parts of the stator iron at high flux density for purposes to later appear.

The other leg provides two opposed pole pieces 7 having opposed concave end faces between which is rotatably supported by bearing plates 8 a rotor 9 preferably of the squirrel cage type having a laminated core 10 in which are set the inductor bars 11 of the squirrel cage. If desired, the ends of the rectangular stator may be rounded off as shown.

Shifting of the magnetic field across the pole faces is produced by the well known action of shading coils 12 extending through holes in the poles and enclosing side portions of the pole sections upon diametrically opposite sides of the rotor. In the present instance, two coils in the form of single turn rings are employed on each pole, dividing the pole into a double shaded section 13 enclosed by both the small and large rings, a single shaded section 14 enclosed by the large ring and an unshaded section 15. In order to hold the two rings in properly spaced relation, the portions thereof lying along the sides of the poles may be disposed in shallow notches 16.

To effect distribution of a substantial amount of the flux threading the unshaded sections 15 to the rotor iron beyond the median plane 17 between the poles, the unshaded side tips 18 of each stator lamination are extended around the rotor to form magnetic connections 19 between the unshaded tips 18 and the shaded side tips 20 of the opposite pole pieces. These connections have inner surfaces which are disposed closely adjacent the rotor surface and constitute continuations of the pole faces proper. Preferably the unshaded tip extensions 19 are made integral with the shaded side tips 20 of the opposite poles so that the rotor surface is completely enclosed by a continuous iron surface and the poles thereby made mechanically rigid with each other.

The present invention contemplates a construction of the unshaded tip extensions which enables a condition of magnetic saturation to be obtained in the iron of the extensions all along the latter at least to a point closely adjacent the shaded tip of the opposite pole and this without increasing the leakage of shaded and unshaded flux around the rotor. To this end, the side surfaces 21 of the unshaded portions of the poles are offset outwardly from the side surfaces 22 of the shaded side portions of the poles. That is to say, the outermost portion of the unshaded section 15 is disposed a greater distance from the longitudinal line 23 through the rotor axis than the outermost portion of the shaded section 13. The surfaces 21 extend parallel to the line 23 at least to the center line 17 and are joined to the surfaces 22 by inclined surfaces 24 so formed that the extensions of the unshaded side tips are of segmental form and substantially uniform in radial width adjacent the shaded tips 20.

With the construction above described, it will be apparent that the extensions of the unshaded side tips taper at least to the line 17 so that in spite of the passage of a substantial amount of unshaded flux to the rotor iron from the unshaded tips 18 proper, the extensions are nevertheless capable of carrying sufficient unshaded flux to maintain saturation in the iron beyond the plane 17. At the same time, the iron of the magnetic connections is of small sectional area adjacent the shaded tips 20 and there is very little iron immediately adjacent those portions of the shading rings which lie against the shaded sides of the poles. As a result of this arrangement, the leakage of unshaded flux directly between the opposite poles and also the flow of shaded flux in local magnetic circuits around the rings is reduced to a minimum. It will be observed that some space outwardly from the sides 22 must be allowed for location of the shading rings so that offsetting the surfaces 21 to the extent contemplated by the present invention does not increase the overall width of the motor to any appreciable degree.

Objectionable leakage of unshaded flux directly through the magnetic extensions 19 is avoided first by the construction of the shading rings 12 of such low resistance that the current induced in the rings will oppose such leakage to a degree sufficient to cause substantially all of the unshaded flux threading the extensions 19 to be diverted into the rotor iron. The smaller ring is more effective in creating such opposition and for best results should have a resistance within the range of approximately 1 to 2 x $10^{-4}$ ohms which includes standard copper wire sizes from 8 to No. 11 gauge. The large ring may be of the same or smaller gauge wire.

The leakage of unshaded flux around the rotor may be reduced further by the provision of a restriction of high magnetic reluctance at a point adjacent the shaded tips 20. In the present instance, such restrictions are in the form of holes 25 stamped in the stator laminations.

I claim as my invention:

1. An alternating current motor combining a rotor, a magnetic iron field member having two pole pieces projecting toward each other in longitudinally offset relation and having opposed faces disposed on opposite sides of said rotor, a shading coil on each pole piece enclosing the side portion thereof closest to the rotor axis, and substantially closed magnetic connections between the side tips of the opposite pole pieces providing inner surfaces constituting continuations of said faces.

2. An alternating current motor combining a rotor, a magnetic field member having two pole pieces with concave faces providing a recess for said rotor, shading coils enclosing side portions of said pole pieces to form shaded and unshaded side tips on diametrically opposite sides of said rotor, the side surfaces of said unshaded side tips extending substantially parallel to the longitudinal center line of said pieces at least to the median plane between the pieces and the side surface of said shaded tips being disposed closer to the rotor axis than said last mentioned side surfaces, magnetic connections each joined to one unshaded tip adjacent said plane and extending around the rotor to the shaded tip of the opposite pole piece, said connections having outer surfaces inclined with respect to said first mentioned side surfaces.

3. An alternating current motor combining a rotor, a magnetic field member having two pole pieces with concave faces providing a recess for said rotor, shading coils enclosing side portions of said pole pieces to form shaded and unshaded side tips on diametrically opposite sides of said rotor, and magnetic extensions of said unshaded side tips integrally joining the shaded and unshaded side tips of opposite pole pieces, each of said extensions tapering from the unshaded pole tip to a point adjacent the median plane between the poles and having a substantially uniform radial width between said plane and the shaded tip of the opposite pole piece.

4. An alternating current motor combining a magnetic field member having two pole pieces with parallel side surfaces and concave end faces defining a rotor recess, a rotor rotatably mounted in said recess, shading rings on said pole pieces enclosing side portions thereof on diametrically opposite sides of said rotor, and substantially closed magnetic connections between the shaded and unshaded side tips of opposite pole pieces having inner surfaces closely following the contour of said rotor and constituting continuations of said pole faces, the planes of the side surfaces of the unshaded portions of said pole pieces being spaced from the rotor axis and disposed exteriorly of said shading rings.

5. An alternating current motor combining a stator providing two pole pieces having opposed concave faces defining a rotor recess, a rotor in said recess, shading coils enclosing side portions of said pole pieces on diametrically opposite sides of said rotor, and magnetic extensions of the unshaded side portions of the pole pieces projecting around the rotor closely adjacent thereto and forming substantially closed magnetic connections between the shaded and unshaded side tips of the opposite pole pieces, the unshaded section of each pole piece at its narrowest point projecting laterally of the longitudinal center line of the pole pieces a distance substantially greater than the shaded pole section at its narrowest point whereby to maintain saturation of the iron in said unshaded pole extensions to points closely adjacent the shaded tips of the opposite poles.

6. An alternating current motor of the character described combining a rotor, a field member providing a plurality of pole pieces projecting toward the rotor and having their corresponding side portions enclosed by shading coils, and magnetic connections joining the adjacent unshaded and shaded side tips of the pole pieces and having inner surfaces closely following the rotor surface, the radial cross-section of each connection decreasing progressively from the unshaded side of each pole piece to the mid-point between the adjacent pole pieces and being substantially uniform between such point and the shaded side tip of the other pole piece.

7. An alternating current motor of the character described combining a rotor, a field member providing a plurality of pole pieces projecting toward the rotor and having their corresponding side portions enclosed by shading coils, magnetic connections joining the adjacent unshaded and shaded side tips of the pole pieces and having inner surfaces closely following the rotor surface, the radial cross-section of each connection decreasing progressively from the unshaded side of each pole piece to the mid-point between the adjacent pole pieces and being substantially uniform between such point and the shaded side tip of the other pole piece, and magnetic restrictions in said connections adjacent the junction of the connections and the shaded side tips of the pole pieces.

8. An alternating current motor of the character described combining a rotor, a field member providing a plurality of pole pieces projecting toward the rotor and having their corresponding side portions enclosed by shading coils, and magnetic connections joining the adjacent unshaded and shaded side tips of the pole pieces and having inner surfaces closely following the rotor surface, the radial cross-section of each connection decreasing progressively from the unshaded side of each pole piece substantially to a point adjacent the median plane between the pole pieces and the average radial cross-section of the connection between said plane and the adjacent shaded tip being not greater than the width of said median plane.

9. An alternating current motor of the character described combining a rotor, a field member of the core type providing two pole pieces projecting toward said rotor in substantial alinement but slightly offset with respect to a plane through the rotor axis projecting longitudinally of the pole pieces, shading rings enclosing side portions of said pole pieces on the sides thereof disposed closest to said plane, substantially closed magnetic connections following the rotor contour between the adjacent shaded and unshaded sides of the pole pieces, the surface on the unshaded side of each pole piece being disposed externally of the shading ring on the opposite pole piece.

10. An alternating current motor of the character described combining a rotor, a field member providing a plurality of pole pieces projecting toward the rotor and having their corresponding side portions enclosed by shading coils, and magnetic connections joining the adjacent unshaded and shaded side tips of the pole pieces and having inner surfaces closely following the rotor surface, the radical width of each connection adjacent or near the unshaded side of the adjacent pole piece being substantially greater than the radial width of the connection at a corresponding distance from the shaded tip of the adjacent pole piece.

11. An alternating current motor of the character described combining a rotor, a field member providing a plurality of pole pieces having corresponding side portions enclosed by shading coils, each of said pieces having parallel side surfaces disposed on opposite sides of the rotor axis with the surface on the unshaded side of the piece spaced a greater distance than the other surface from said axis, and substantially closed magnetic connections between the adjacent unshaded and shaded side tips of the pole pieces, the portion of each connection between the unshaped tip and the mid-point between the pole pieces having substantially greater flux carrying capacity than the remaining portion of the connection.

12. An alternating current motor of the character described combining a rotor, a field member of the core type providing two pole pieces having corresponding side portions enclosed by shading coils, the longitudinal center line of each of said pieces being offset from the rotor axis in the direction of the unshaded side of the piece, and closed magnetic connections following the rotor contour between the unshaded side portion of one pole piece and the shaded side portion of the other pole piece and tapering from said unshaded side portion toward the shaded side portion.

DUNCAN J. STEWART.